(12) United States Patent
Jannink (10) Patent No.: US 9,142,216 B1
(45) Date of Patent: Sep. 22, 2015

(54) SYSTEMS AND METHODS FOR ORGANIZING AND ANALYZING AUDIO CONTENT DERIVED FROM MEDIA FILES

(71) Applicant: Jan Jannink, Menlo Park, CA (US)

(72) Inventor: Jan Jannink, Menlo Park, CA (US)

( * ) Notice: Subject to any disclaimer, the term of this patent is extended or adjusted under 35 U.S.C. 154(b) by 350 days.

(21) Appl. No.: 13/751,115

(22) Filed: Jan. 27, 2013

Related U.S. Application Data (60) Provisional application No. 61/592,171, filed on Jan. 30, 2012.

(51) Int. Cl.
*G10L 15/00* (2013.01)
*G10L 15/26* (2006.01)

(52) U.S. Cl.
CPC ...................................... *G10L 15/26* (2013.01)

(58) Field of Classification Search
USPC .................. 704/231–257, 270–275
See application file for complete search history.

(56) References Cited

U.S. PATENT DOCUMENTS

| | | | |
|---|---|---|---|
| 6,404,856 B1 * | 6/2002 | Wilcox et al. | 379/67.1 |
| 6,507,643 B1 * | 1/2003 | Groner | 379/88.14 |
| 6,603,921 B1 * | 8/2003 | Kanevsky et al. | 386/253 |
| 6,697,796 B2 * | 2/2004 | Kermani | 379/88.14 |
| 2002/0093591 A1 * | 7/2002 | Gong et al. | 348/515 |
| 2006/0212897 A1 * | 9/2006 | Li et al. | 725/32 |
| 2011/0040774 A1 * | 2/2011 | Peoples et al. | 707/765 |

* cited by examiner

*Primary Examiner* — Jesse Pullias (57) ABSTRACT

Systems for receiving, analyzing, and organizing audio content contained within a plurality of media files are disclosed. The systems generally include a server that is configured to receive, index, and store a plurality of media files, which are received by the server from a plurality of sources, within at least one database in communication with the server. The server is further configured to organize audio content included within each of the plurality of media files into a bipartite graph, wherein the bipartite graph will include vertices that are correlated with a specific media file or an individual who is associated with a specific media file. These vertices will comprise edges that are labeled with a word that is detected from within the audio content of the media file.

8 Claims, 10 Drawing Sheets

SYSTEMS AND METHODS FOR ORGANIZING AND ANALYZING AUDIO CONTENT DERIVED FROM MEDIA FILES

CROSS-REFERENCE TO RELATED APPLICATIONS

This application is a non-provisional application of, and claims priority to, U.S. provisional patent application Ser. No. 61/592,171, filed on Jan. 30, 2012.

FIELD OF THE INVENTION

The field of the present invention relates to systems and methods for recording, indexing, and searching various types of media files and the audio tracks included therein and, more particularly, to systems and methods for organizing and analyzing the content of such audio tracks, as well as extracting relevant key words from a plurality of media files using specific content organization and analysis techniques.

BACKGROUND OF THE INVENTION

Systems for recording and storing media files have been available for many years and, indeed, are used by many individuals and businesses today. In addition, currently-available systems allow users to retrieve, either using a telephone or internet connection, media files that may be stored in a database and correlated with a specific user of the system. Although these systems have become a ubiquitous part of communication (and communication management) in today's world, these systems do not efficiently organize and analyze the content of such media files, particularly in a way that identifies commonalities among a plurality of media files.

For example, currently-available systems do not efficiently analyze a plurality of media files in a manner that allows users to identify key words (or phrases) that are shared across a multitude of media files (or shared across content that is contributed by a particular individual within multiple media files). Still further, currently-available systems do not provide an efficient means for labeling a plurality of media files with various relevant attributes, such as the source of such files, key word usage and frequency, the context in which certain media files are generated, the connectivity and inter-relationships among a multitude of media files, and various other attributes.

As described further below, the present invention addresses many of these, and other, drawbacks that are associated with currently-available media storage and retrieval systems.

SUMMARY OF THE INVENTION

Systems for receiving, analyzing, and organizing audio content contained within a plurality of media files are disclosed. The systems generally include a server that is configured to receive, index, and store a plurality of media files, which are received by the server from a plurality of sources, within at least one database in communication with the server. In addition, the server is configured to make one or more of the media files accessible to and searchable by, one or more persons—other than the original sources of such media files. Still further, the server is configured to organize audio content included within each of the plurality of media files into a bipartite graph. The bipartite graph will include vertices, with each vertex being correlated with a specific media file or an individual who is associated with a specific media file. These vertices will comprise edges that are labeled with a word that is detected from within the audio content of a media file. Such audio content organization and analytical methods provide new and powerful ways to, among other things, execute unique key word extraction algorithms, to identify and even suggest to a user of the system which key word(s) may be relevant to the user.

According to such aspects of the invention, the edges of the vertices in the bipartite graph may be assigned a secondary label. Examples of these secondary labels may include: (1) a speaker label that indicates that a specific individual is speaking within the corresponding audio content; (2) a share label that indicates that an individual received access to the corresponding audio content from a third party (i.e., the third party referred the media file/audio content to such individual); (3) a podcast label that indicates that an RSS source is correlated to the corresponding audio content; (4) a comment label that indicates that certain commentary, authored by users of the system, has been associated with the corresponding audio content; (5) a frequency label that indicates a number of times that defined portions of the corresponding audio content have been accessed by users of the system; and (6) combinations of the foregoing labels.

The invention provides that one of three operations may be applied to several sets of edges (and the key words they represent) extracted from the bipartite graph. For example, as described further below, a union operation may be employed, which calculates a sum of frequency values for each of a plurality of words found within the audio content of a plurality of media files (with a frequency value representing a number of times that a word is detected within the audio content of a media file). In addition, as described further below, an intersection operation may be utilized, which calculates a sum of frequency values for only those words that are shared among a plurality of media files. Still further, the invention provides that a filter operation can be used, which calculates a sum of frequency values for only those words that are detected within media files that share a secondary label (mentioned above).

The invention provides that additional data organization methods—other than those involving a bipartite graph—may be utilized. However, the invention provides that the audio content organization and analysis methodology described herein enables the application of unique key word extraction algorithms, to identify and even suggest to a user of the system which key word(s) may be relevant to the user. For example, the system may be configured to extract podcast key words from a plurality of media files, which are identified by performing a union operation on a set of media files which exhibit a common podcast label. The system may be configured to extract heat map key words from a plurality of media files, which are identified by performing an intersection operation on a set of key words found within a plurality of media files which exhibit a frequency label that exceeds a minimum threshold. In addition, the system may be configured to extract unheard key words from a plurality of media files, which are identified by performing a union operation that identifies a set of key words that are present across a plurality of media files, which have not yet been heard by users of the system. Still further, the system may be configured to extract comment key words from a plurality of media files, which are identified within segments of audio recordings that are associated with third party comments. The system may further be configured to extract personal or account key words from a plurality of media files, by identifying all key words having a frequency label that exceeds a minimum threshold, which are assigned to the edges of vertices and are correlated to a single person or account. These are a few non-limiting examples of the unique types of key word extraction algorithms that may be applied to the audio content included within a plurality of media files, when such media files are organized and analyzed in the manner described herein.

The above-mentioned and additional features of the present invention are further illustrated in the Detailed Description contained herein.

DETAILED DESCRIPTION OF THE INVENTION

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Description of the Media File Storage and Retrieval Systems

Figure 1:
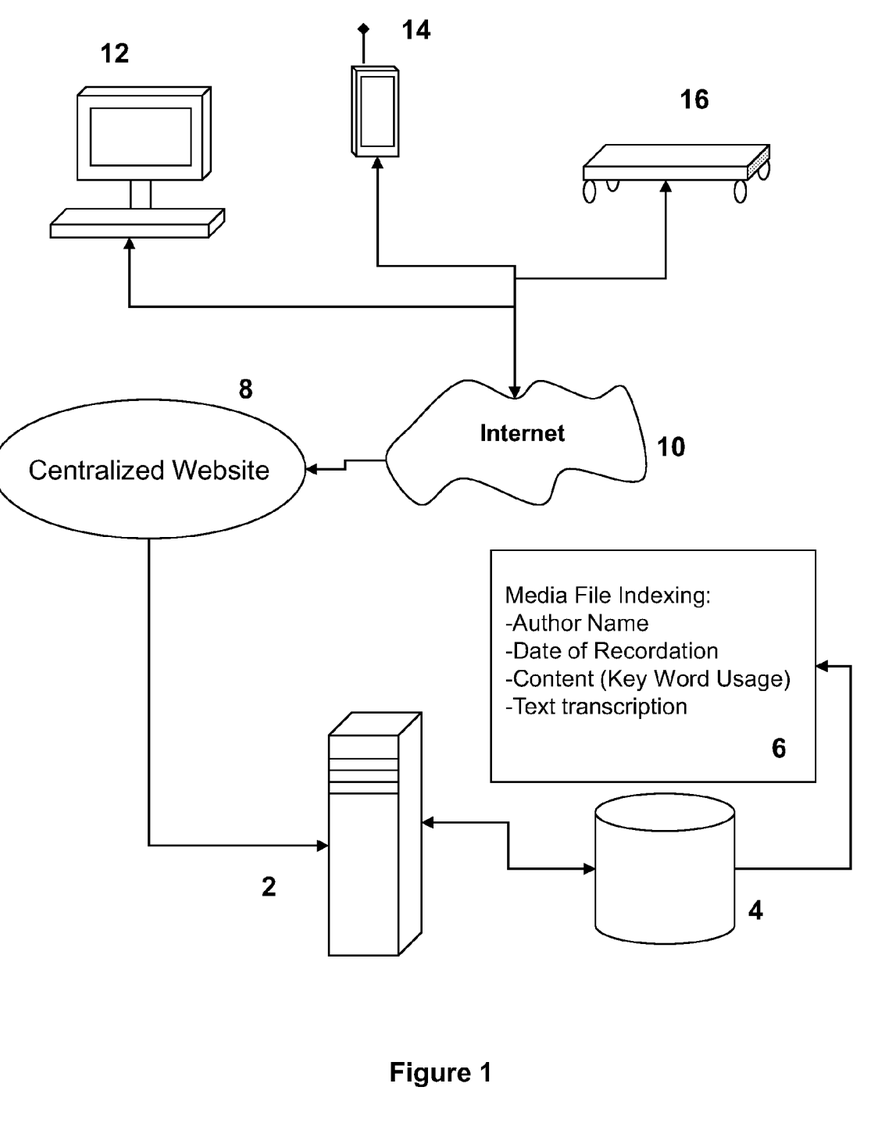
FIG. 1 is a diagram showing the different components of the systems described herein.

According to certain preferred embodiments, the present invention generally utilizes systems for recording, indexing, transcribing, and sharing media files among a plurality of users. As used herein, the term "media file(s)" refers to audio files, video files, voice recordings, streamed media content, and combinations of the foregoing. Referring to FIG. 1, the systems generally comprise a server 2 that is configured to receive, index, and store a plurality of media files, which are received by the server 2 from a plurality of sources, within at least one database 4 in communication with the server 2. The invention provides that the database 4 may reside within the server 2 or, alternatively, may exist outside of the server 4 while being in communication therewith via a network connection.

When the present specification refers to the server 2, the invention provides that the server 2 may comprise a single server or a group of servers. In addition, the invention provides that the system may employ the use of cloud computing, whereby the server paradigm that is utilized to support the system of the present invention is scalable and may involve the use of different servers (and a variable number of servers) at any given time, depending on the number of individuals who are utilizing the system at different time points, which are in fluid communication with the database 4 described herein.

The media files may be indexed 6 and categorized within the database 4 based on author, time of recordation, geographical location of origin, IP addresses, language, key word usage, combinations of the foregoing, and other factors. The invention provides that the media files are preferably submitted to the server 2 through a centralized website 8 that may be accessed through a standard internet connection 10. The invention provides that the website 8 may be accessed, and the media files submitted to the server 2, using any device that is capable of establishing an internet connection 10, such as using a personal computer 12 (including tablet computers), telephone 14 (including smart phones, PDAs, and other similar devices), meeting conference speaker phones 16, and other devices. The invention provides that the media files may be created by such devices and then uploaded to the server 2 or, alternatively, the media files may be streamed in real time (through such devices) with the media files being created (and then indexed and stored) within the server 2 and database 4. In addition, as explained above, the invention provides that the media files that are stored within the server 2 and database 4 may be derived from audio-only content (e.g., a telephone conversation or talk radio) or, in certain cases, may comprise audio tracks derived from a video file (which has an audio component embedded therein).

The invention provides that the server 2 may receive and manage media files in many ways, such that the contents thereof may be deciphered and used as described herein. For example, the invention provides that upon a media file being submitted to the server 2, the server 2 will perform a speech-to-text, speech-to-phoneme, speech-to-syllable, and/or speech-to-subword conversion, and then store an output of such conversion within the database 4. This way, the content of each media file may be intelligently queried and used in the manner described herein, such as for querying such content for key words.

The invention provides that when reference is made to "media files that contain a key word," and similar phrases, it should be understood that such phrase encompasses a text file that contains the key word, with the text file being derived from a media file, as explained above. In other words, for example, after performing a speech-to-text conversion, and storing such text within the database 4, if a search is performed using the system of the present invention for media files that contain a particular key word, the system will actually search the converted text forms of such media files. Upon identifying any text forms of such media files that contain the queried key word, it will be inferred that the media file that corresponds with the searched text file will actually contain the key word.

Figure 2:
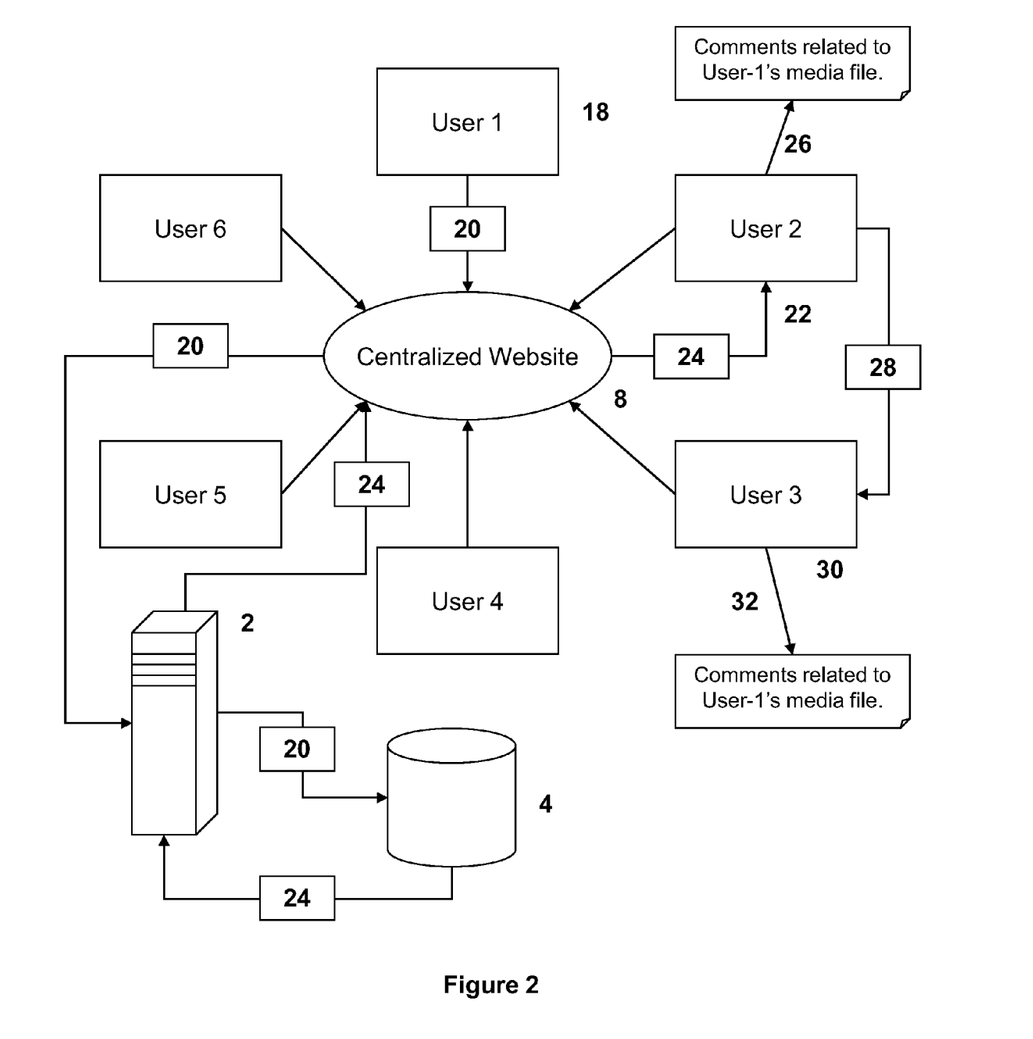
FIG. 2 is a diagram showing the interactive nature and media file sharing capability of the systems described herein.

Referring now to FIG. 2, according to certain preferred embodiments, the invention provides that the server 2 is configured to make one or more of the media files accessible to persons other than the original source (or author) of the media files. The invention provides that the term "source" refers to a person who is responsible for uploading a media file to the server 2, whereas the term "author" refers to one or more persons who contributed content to an uploaded media file (who may, or may not, be the same person who uploads the media file to the server 2). For example, as illustrated in FIG. 2, a first user (User-1) 18 may submit 20 a media file to the server 2 through the centralized website 8, which is then indexed and stored within a database 4. The invention provides that if certain conditions are satisfied, as described below, the media files that the first user (User-1) 18 records within and uploads to the database 4 will then be accessible by other persons. For example, a second user (User-2) 22 may retrieve 24 and listen to User-1's media file from the database 4 through the centralized website 8.

Upon retrieving and accessing User-1's media file, User-2 22 may publish comments 26 regarding User-1's media files within a graphical user interface of the website 8. Moreover, User-2 22 may publish comments 26 regarding certain limited portions of User-1's media files, with the relative location of such comments being quickly ascertainable within the graphical user interface of the website 8. The invention provides that the comments 26 may be submitted to the server 2 through the website 8 by User-2 22, or any other persons who are granted access to User-1's 18 original media files. The invention provides that the comments 26 will be associated with User-1's 18 original media files within the database 4, along with other information collected by the server 2, such as the identity of the user/person submitting the comments 26, the date and time of submission, and/or other relevant information.

The invention further provides that the comments 26 may be viewed by any person accessing the website 8 or, alternatively, a limited group of persons who are granted access to User-1's 18 original media files. For example, an author of a media file, and/or the person (source) who submits a media file to the server 2, may submit instructions to the server 2 which only allow certain persons to access and listen to the media file. The invention provides that such access controls may be employed if a user (or author or source of a media file) does not want a media file to be generally available to all users of the system.

Figure 3:
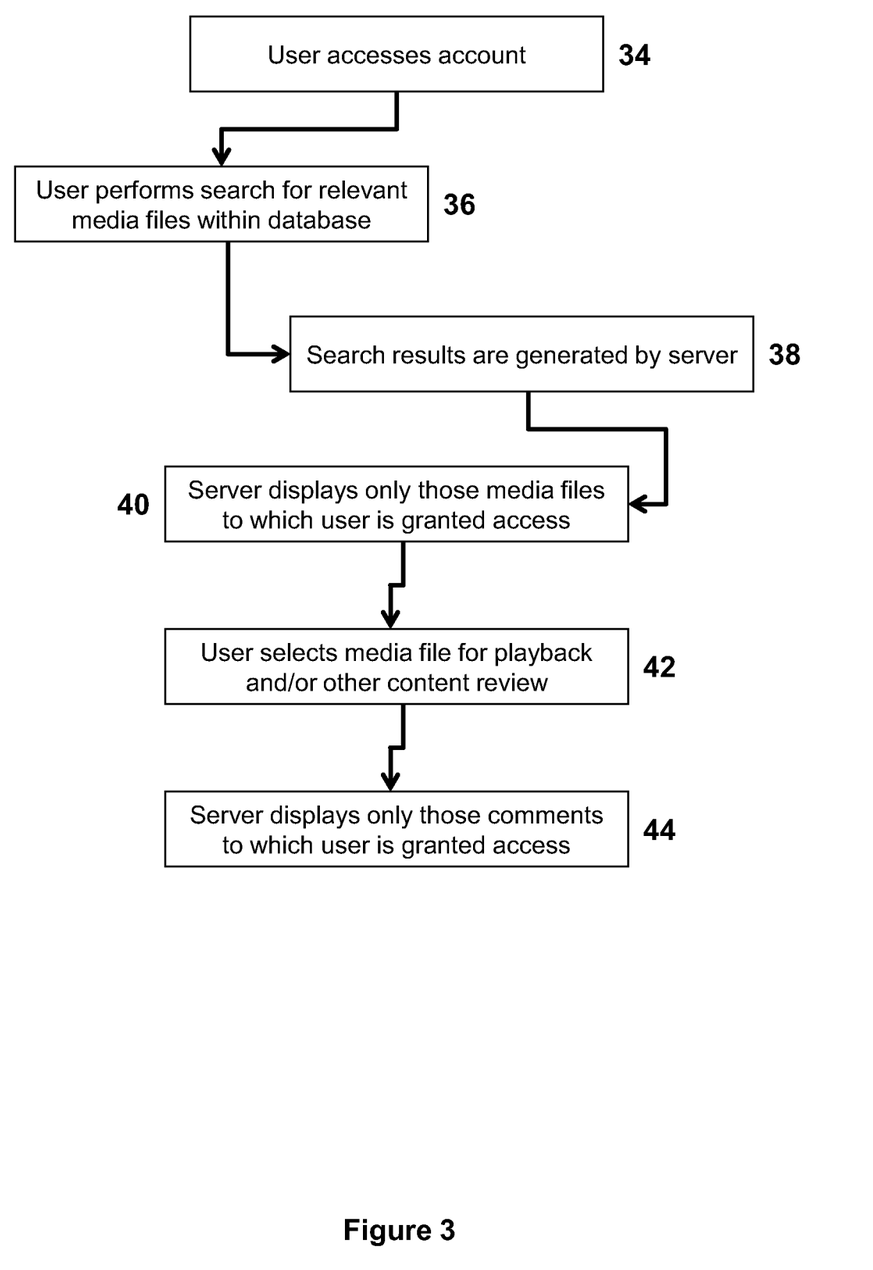
FIG. 3 is a flow chart illustrating the controls provided by the systems described herein, which allow only specified users to access certain media files and/or comments related thereto within the centralized website.

Referring to FIG. 3, for example, the invention provides that a user may access his/her account 34, by providing the server 2 with an authorized username/password through the centralized website 8. The user may then perform a search 36 of the database 4 for desired media files, namely, media files containing one or more search terms (key words), as described herein. The invention provides that the server 2 will then generate a list of results 38, i.e., media files that contain one or more of the queried search terms, and then display (within the centralized website 8) only those media files to which the user is granted access 40. The user may then select one or more media files within the viewable search results for playback and/or other content review 42. In addition, upon selecting a media file from the search results within the centralized website 8, the server 2 will display only those comments (related to the selected media file) that the user is allowed to view 44. In other words, the individuals who publish comments regarding a media file may further limit access to such comments to only authorized users of the system.

Referring now to FIG. 2, according to certain preferred embodiments, the invention provides that a user of the system, such as User-2 22, may refer 28 a media file (with or without comments 26 associated therewith) to another user. When the other user, e.g., User-3 30, receives notice of such referral 28, the other user may access and listen to the referred media file and, optionally, publish comments 32 regarding User-1's media files within a graphical user interface of the website 8. In addition, the invention provides that users of the system may share, refer, and transmit to other users a limited portion of one or more media files. For example, if a first user determines that a second user may find a particular portion of a media file to be of interest, the first user may refer only the interesting portion of that media file to the second user. According to such embodiments, the invention provides that the graphical user interface of the website 8 may include certain controls which allow a user to excise portions of a media file and refer the same to another user, e.g., by using time coordinates associated with a media file, from beginning to end, to identify and refer only the relevant portion of a media file to another user of the system. The act of referring a media file, or an excerpted version thereof, may be carried out by sending, e.g., by e-mail, a hyperlink to another individual (with the hyperlink being associated with and linked to a place in the database 4 from which the media file, or an excerpted version thereof, may be retrieved).

As mentioned above, according to certain preferred embodiments of the present invention, the system is configured to allow users to query the database 4, preferably through the website 8, for media files that include within the content thereof one or more key words. A non-limiting example of a portion of a graphical user interface showing an exemplary search function 46 is provided in FIG. 4. More particularly, the invention provides that the server 2 of the system may be configured to receive one or more key words 48 that are submitted by a user of the system through the website 8, whereupon the server 2 queries the database 4 to identify all media files which include the one or more key words 48. The invention provides that the system, and search function 46, may employ Boolean search logic, e.g., by allowing conjunctive and disjunctive searches, truncated and non-truncated forms of key words, exact match searches, and other forms of Boolean search logic.

Figure 4:
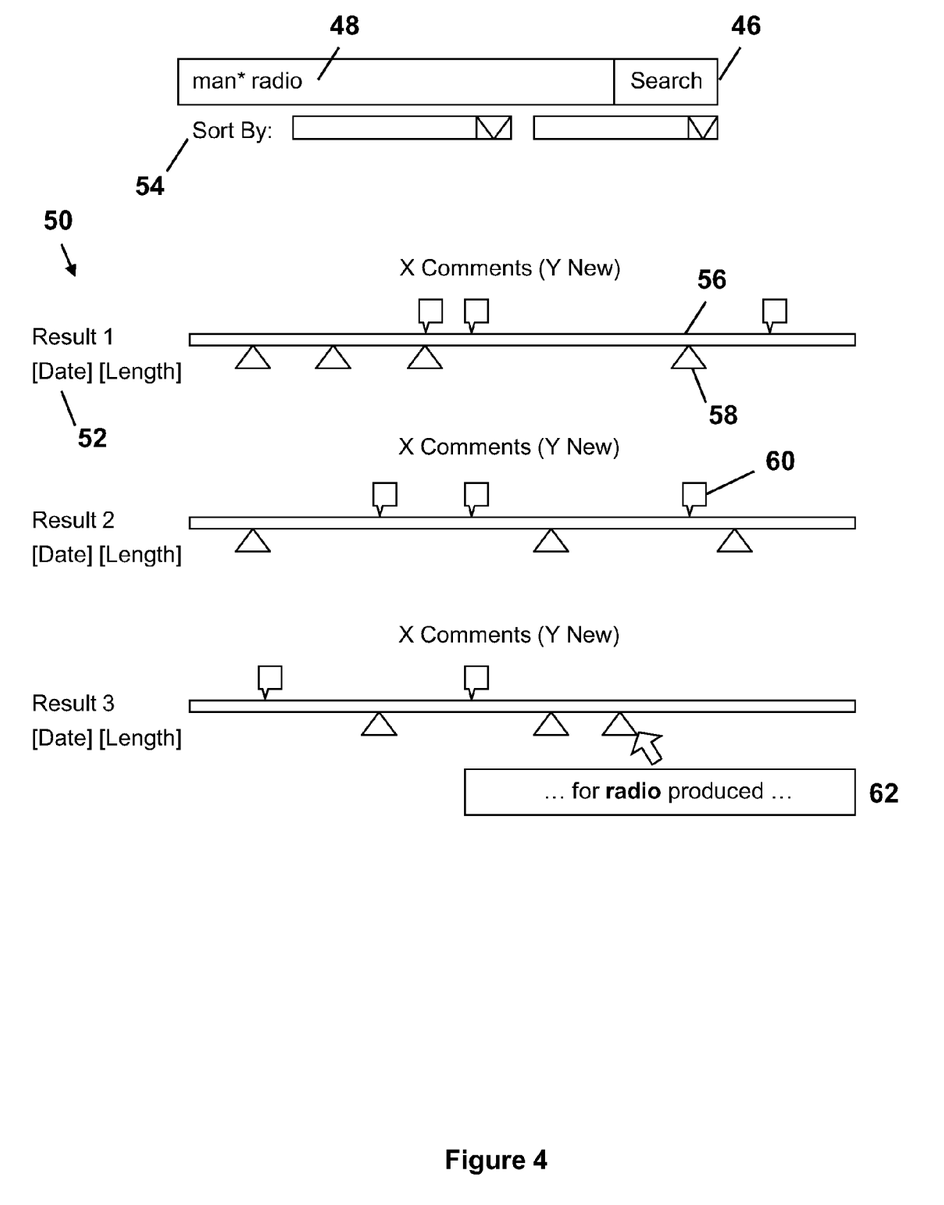
FIG. 4 is a diagram showing certain non-limiting components of an exemplary graphical user interface in which a user may query the content of a plurality of media files, identify those media files which include a certain key word (or set of key words) that the user defines, and quickly view the context in which such key word is used in one or more media files.

The server 2 may then present the search results 50 to the user within the website 8 and, preferably, list all responsive media files in a defined order within such graphical user interface, but only those media files to which the user has been granted access, as described above. For example, the search results may list the media files in chronological order based on the date (and time) 52 that each media file was recorded and provided to the database 4. In other embodiments, the media files may be listed in an order that is based on the number of occasions that a key word is used within each media file. Still further, the media files may be listed based on the number of occurrences of key words in metadata associated with the media files, such as titles, description, comments, etc. In addition, the media files may be listed by measuring user activity, such as the number of views or plays, length of playing time, number of shares and comments, length of comments, etc. These criteria, combinations thereof, or other criteria may be employed to list the responsive media files in a manner that will be most relevant to the user. Still further, the invention provides that a user may specify the criteria that should be used to rank (and sort) the search results, with such criteria preferably being selected from a predefined list 54.

Still referring to FIG. 4, each media file included within a set of search results will preferably be graphically portrayed, such as in the form of a line 56 that begins at time equals zero (t=0) and ends at a point when the media file is terminated. For example, if the total length of a media file is five minutes, the left side of the line will be correlated with t=0 of the media file, whereas the right side of the line will be correlated with t=5 minutes of the media file. Still further, the invention provides that the location of each search term that was queried may be indicated along the line 56. For example, the location of each search term may be indicated with a triangle 58, or other suitable and readily visible element. The invention further provides that if multiple search terms were used in the search, the line 56 may be annotated with multiple triangles 58 (or other suitable elements), each of which may exhibit a different color that is correlated with a particular search term. More particularly, for example, if two search terms are used, the line 56 may be annotated with triangles 58 (or other suitable elements), which exhibit one of two colors, with one color representing a location of a first search term (key word) and a second color indicating the location of a second search term (key word).

The invention further provides that each line 56 that represents a relevant media file may be annotated with one or more comments 60 posted by other users, as described herein. The invention provides that such annotation of the comments 60 will preferably indicate the location within the media file to which each comment 60 relates. According to yet further embodiments, the invention provides that when a user places a cursor (within the graphical user interface of the centralized website 8) over or in the near vicinity of a triangle 58 (or other element indicating the location of a search term) or a comment 60, the graphical user interface of the website 8 will automatically publish a temporary text box 62 in which the search term may be viewed, along with a limited number of words before and after the search term (i.e., the context in which the search term is used), which were transcribed by the system from the media file.

The invention provides that the text box 62 (which contains the transcribed text) will allow a user to quickly review the context in which the search term is used, which will facilitate knowing whether the media file (or a portion thereof) may be relevant to the user and worthy of playback and/or further review. According to certain embodiments, the invention provides that a user may, optionally, control the number of words appearing before and after the search term in the text box 62, by entering the desired number of words in a specified field within the user's dedicated account page. This way, each user may adjust the size of the text box 62 in accordance with his/her personal preferences.

Figure 5:
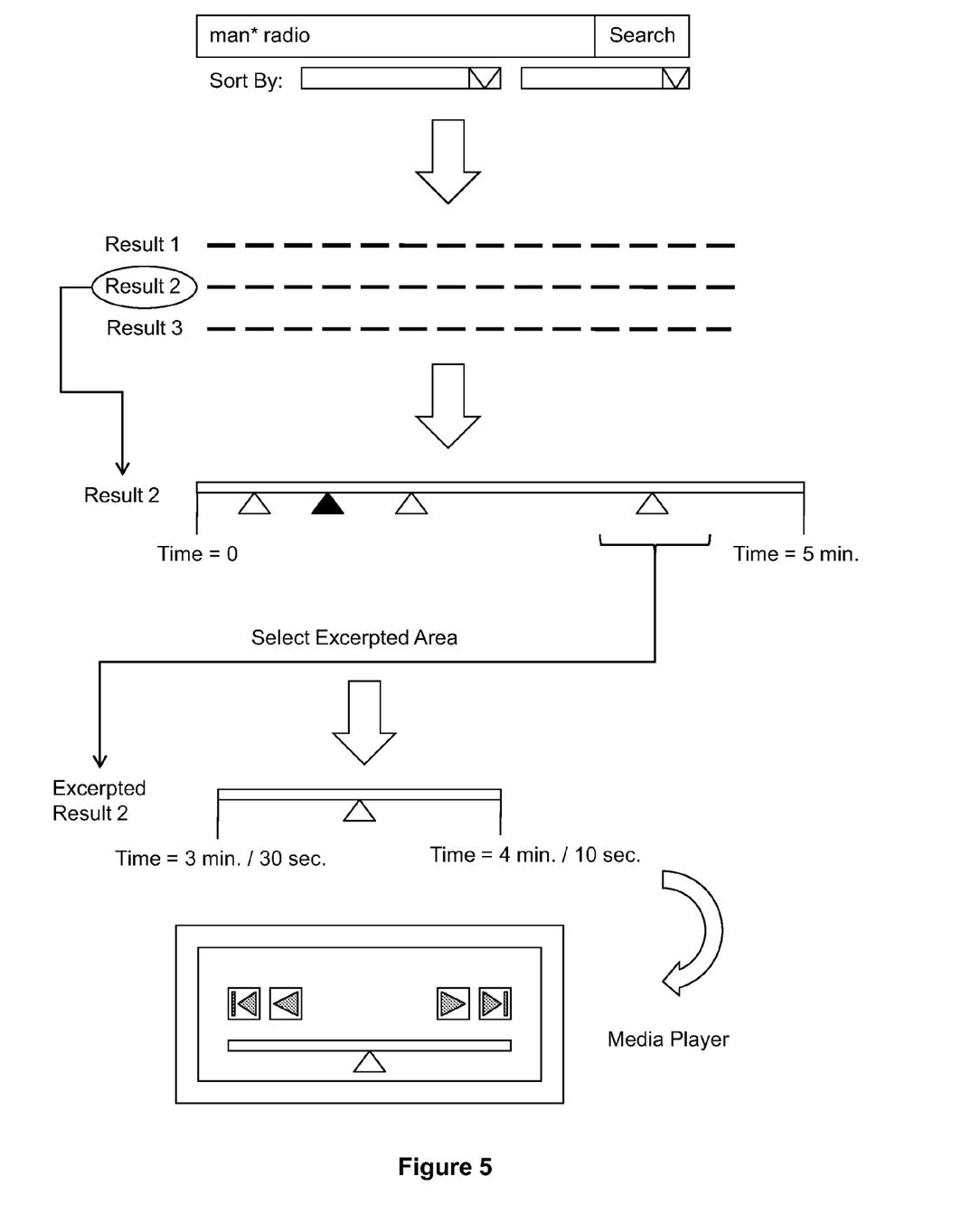
FIG. 5 is another diagram that illustrates the means by which the systems and methods described herein allow users to query a large body of media files, and then playback excerpted and relevant portions thereof using a media player.

According to still further embodiments, the present invention provides that upon selecting a media file within the search results 50, the server will publish a portion of the transcribed text that surrounds the location of a key word. According to such embodiments, upon selecting the key word (or any other word included in the published text), the server 2 will cause a portion of the corresponding audio track (audio content) to be streamed to the user's device 12,14. Here again, the audio content may begin at the exact location at which the selected key word is found within the media file or, alternatively, at a predefined period of time prior to the location of the key word. As illustrated in FIG. 5, the invention provides that each media file that is selected and streamed to a user's device 12,14 may be graphically portrayed within the graphical user interface of the centralized website 8, which may further include a media player that allows a user to control the playback of the media file (or portion thereof).

Key Word Search Functionality

According to certain preferred embodiments of the invention, the search functionality of the system may employ an auto-complete feature. For example, the search functionality may utilize an auto-complete drop-down menu, which lists various proposed key words that may be used to perform the search. The invention provides that these proposed key words will preferably represent the most relevant key words, as determined by the server 2 of the system. The server 2 of the system will maintain a running log of the most relevant key words, which will be identified and extracted from text, using the analytics methods described below, which have been transcribed from one or more media files that have been indexed within the system as described above. In certain embodiments, the search functionality may also be configured to automatically present a list of proposed key words when a user clicks a search bar (or places a cursor in a search text field). When and if a user selects any of the proposed key words that are presented in the auto-complete feature described above, the system will automatically conduct a search of the plurality of media files using the selected key words.

The system will preferably employ an algorithm (or other means) for proposing the most frequently searched and information-rich key words in the auto-complete feature. In other words, the system will preferably factor both of those criteria when calculating its proposed list of key words, which will thereby create a list of proposed key words that are most relevant to a user of the system. The system will maintain a record of the key words that are most frequently search by users of the system. In addition, the system will continually analyze the transcripted text from all media files, preferably using the analytics methods described below, which are provided to the system, as the files are being indexed therein. In addition, the system will be configured to analyze the transcripted text from all media files that are present in a set of search results generated by users over a period of time. This way, the above-referenced algorithm will be capable of assigning a score to various words (potential key words) included within such text. This scoring technique may also be applied to adjacent word pairs, or longer sequences of words (e.g., phrases and the like). The criteria that are factored into such scores may include, but are not limited to, the frequency of such key words in a body of text, the length of text in which the key words are present, the nature of the speech in which such key words are found, whether a particular word is a "stop word," and others.

The system will maintain a running aggregation of scores for a body of key words (or, as mentioned above, groups of key words), with such aggregation being calculated across multiple bodies of texts derived from the media files provided to the system. The system may prioritize and rank key words by calculating a mean score value for each key word (or groups of key words) across the plurality of texts (media files) analyzed. The system may then rank such key words based on the calculated mean score values. The invention provides that the system may prioritize and rank key words by other means as well, provided that the goal of such ranking system is to present to a user of the system a set of proposed key words that are possibly the most relevant to the user, based on the most frequently searched and information-rich key words identified by the system.

Audio Content Organization and Analytics

According to yet further embodiments of the present invention, the systems described herein further comprise improved means for analyzing and filtering media files and the audio content included therein. These methods are particularly useful for identifying, and suggesting, relevant key words for users, as described above. In such embodiments, the server 2 will be configured to treat the audio content of media files as a collection of individual words, sequential word pairs, sequential word triples, and so on. This collection of words may be considered (in a mathematical sense) as a multiset, such that each item (i.e., word, word pair, word triple, etc.) is associated with a frequency of occurrence.

Figure 6:
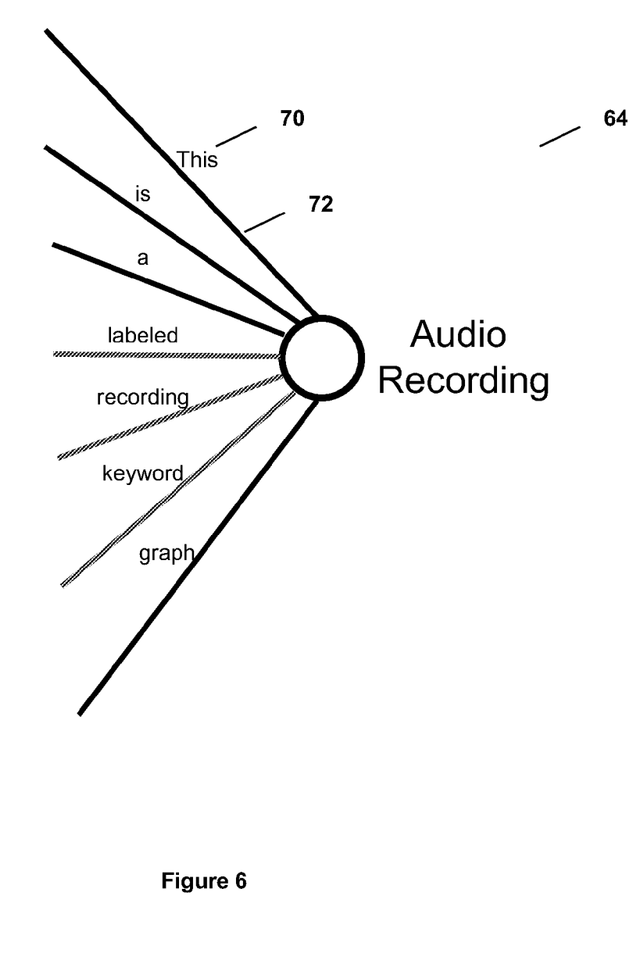
FIG. 6 is a non-limiting example of a graph vertex described herein, which is correlated to a specific media file (audio recording), which illustrates the words that are assigned (labeled) to the various edges shown therein.
Figure 7:
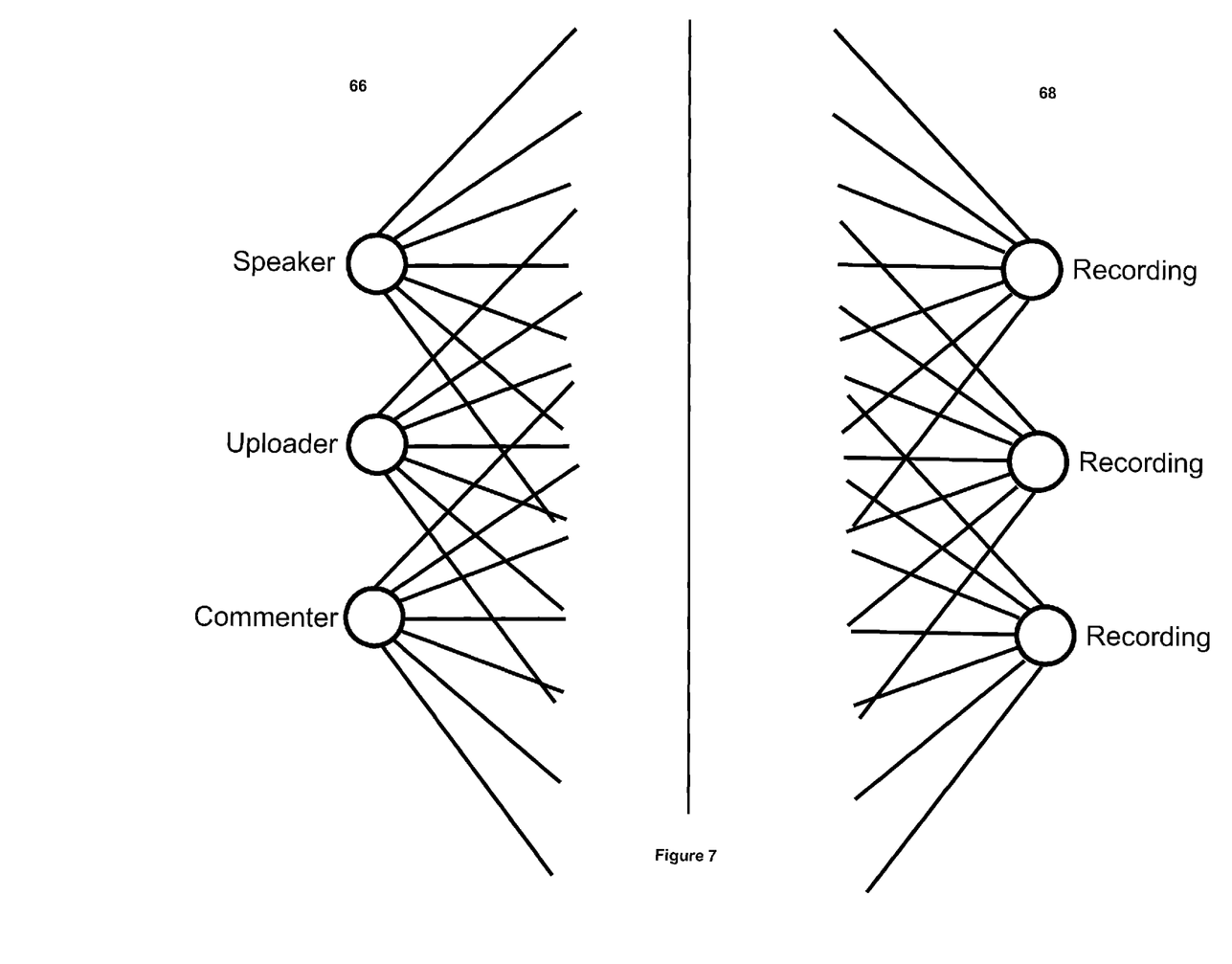
FIG. 7 is a non-limiting example of a plurality of vertices of a bipartite graph described herein, with several vertices oriented in a left column that are correlated to an individual (i.e., a speaker, media file uploader, or commenter) and several vertices oriented in a right column that are correlated with specific media files (audio recordings).
Figure 8:
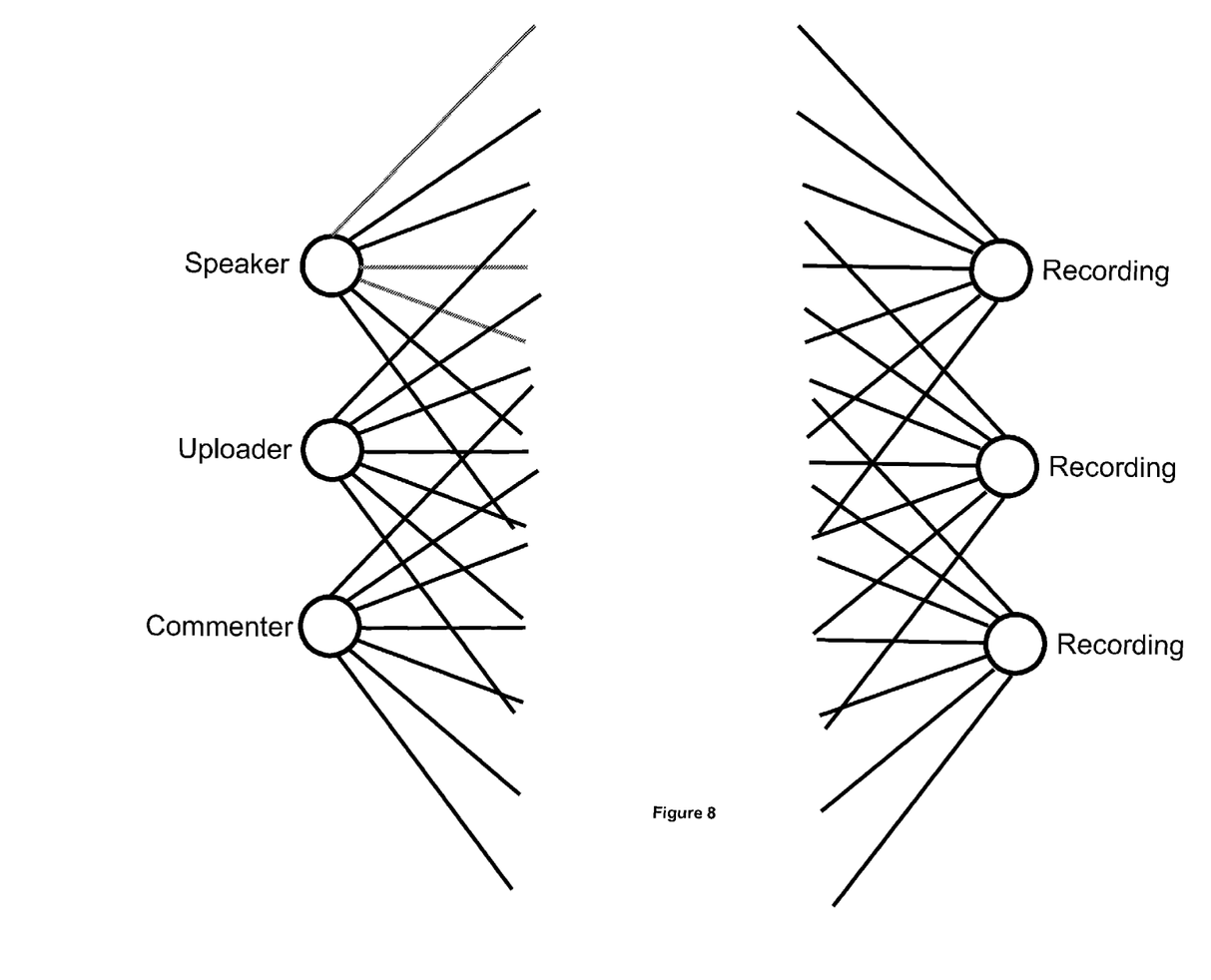
FIG. 8 is a reproduction of the vertices shown in FIG. 7, in which a user has performed an operation that identifies several relevant key words (e.g., high-frequency key words) within the edges (shown in red) of the vertices that are correlated with a speaker of certain audio content.
Figure 9:
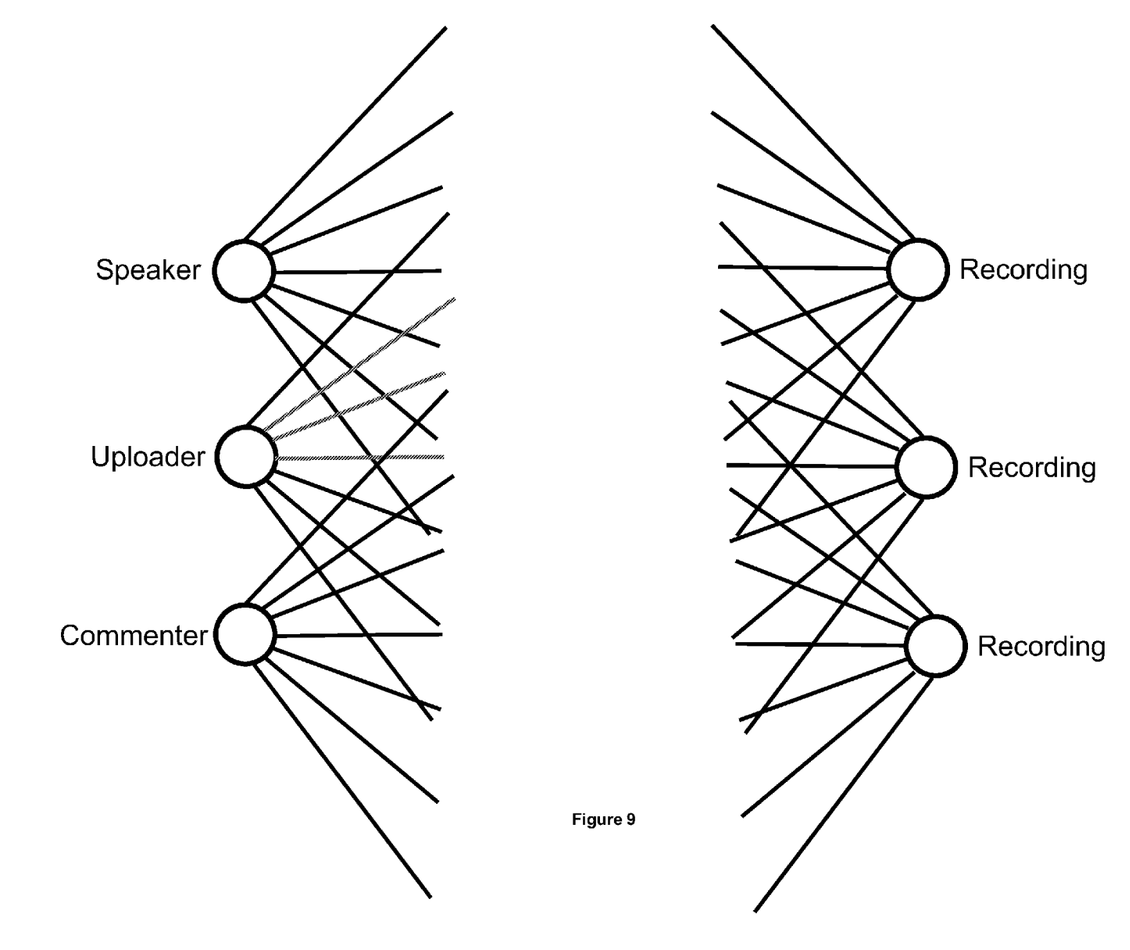
FIG. 9 is a reproduction of the vertices shown in FIG. 7, in which a user has performed an operation that identifies several relevant key words (e.g., high-frequency key words) within the edges (shown in red) of the vertices that are correlated with an individual who uploaded the subject media file.
Figure 10:
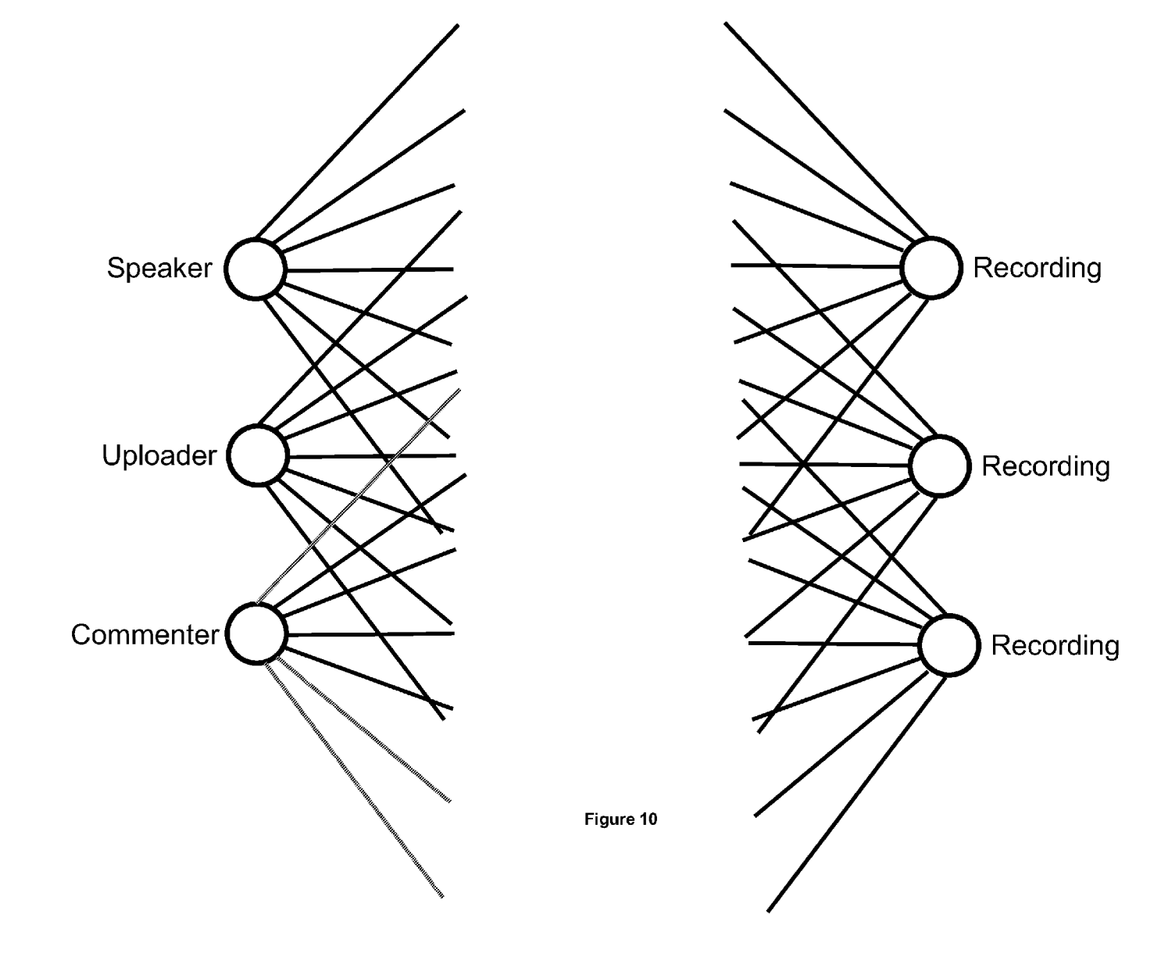
FIG. 10 is a reproduction of the vertices shown in FIG. 7, in which a user has performed an operation that identifies several relevant key words (e.g., high-frequency key words) within the edges (shown in red) of the vertices that are correlated with an individual who published and associated comments with the subject media file.

According to such embodiments, and referring now to FIG. 6, the system will be configured to construct a vertex 64 for each media file (or, more particularly, the audio content included within such media files). Similarly, the system will construct at least one vertex 64 for at least one of the individuals who may be associated with each such media file/audio content (FIG. 7). The association between an individual and audio content may be, for example, (1) that the individual is a speaker in the audio content (i.e., a participant), (2) the individual was responsible for uploading the media file to the system (i.e., a person managing an account within the system described herein), (3) the individual was a recipient of the media file (i.e., it was referred 28 to the individual by another), (4) the individual accessed the particular media file and listed to the audio content thereof, or (5) the individual published comments 26 about the media file. Referring to FIG. 7, these vertices 64, when being used for the analysis described herein, may be oriented separately, e.g., with the vertices pertaining to individuals in a first left column 66 and the vertices associated with the media files/audio content in a second right column 68.

As illustrated in FIG. 6, the invention provides that spoken words (and word pairs, word triples, etc.) 70 that are detected within the audio content of a media file may be assigned as labels to the edges 72 of the vertices 64, which are constructed for each of the plurality of media files that are provided to the system. Likewise, the spoken words 70 that are detected within such audio content may be assigned to the edges 72 of the vertices 64 that are constructed for the individuals who are speaking such words. The invention provides that the system may apply relevancy values to such words 70, whereby words 70 that represent pronouns, verbs, and subject-intensive words are considered more relevant than, for example, conjunctive words, prepositions, and the like.

Although other data organization methods can be used in the present invention, the types of graph structures described herein (and shown in FIG. 7)—between the audio content within media files and the individuals who are correlated with such content—allow the words 70 detected therein to be organized and utilized in various ways that are amenable to the application of various key word extraction algorithms to such multisets. That is, by constructing and analyzing these types of vertices for people and audio content, in which the vertices are people on the one hand (e.g., in a left column 66) and audio recordings on the other (e.g., in a right column 68), with the edges 72 of such graphs that connect people and audio content representing words, the system will be configured to offer a new collection of words (across multiple media files and/or associated individuals) that can be subjected to any of various key word extraction algorithms, such as those discussed above.

The invention provides that the above methods may be used for identifying words, within the audio content of media files, which exhibit a high frequency of access by others (e.g., the most listened to portions of the audio content of a media file). For example, at the instruction of a system user, the server 2 may identify the media files having the highest frequency of playback, and then analyze the contents of such files for words 70 (which may be assigned to the edges 72 of the vertices 64 described herein) that are found to be present in multiple, or a defined minimum number of, such frequently played media files. In another example, the system may be instructed to identify relevant key words for a particular individual. More particularly, the system may query the words assigned to the edges 72 of the vertices 64 that are assigned to a particular individual, and identify those words 70 that are most frequently spoken or used by such individual.

The invention further provides that the system may be configured to apply additional (secondary) labels to the edges, between audio content of media files and individuals. More specifically, in one example, the system may assign a speaker label to a particular edge, to indicate that a specific individual is speaking within the corresponding audio content. In addition, for example, a share label may be assigned to a particular edge, in order to signal that an individual received access to the corresponding audio recording from a third party (i.e., that it was referred 28 to such individual). The invention provides that a podcast label may be assigned to audio content, to indicate an RSS source that should be correlated thereto. Still further, the system may apply comment labels to graphs that correspond to particular audio content, in order to indicate that certain commentary 26 (text) has been associated with such audio content by a user of the system. Of course, the invention further provides that a frequency label may be applied to the edges of the graphs described herein, which represents the number of times that defined portions of audio content have been accessed by users of the system.

The invention provides that at least three different types of mathematical operations may be used to combine edges from a bipartite graph (or set of graphs) into different and usable multisets. First, a union operation may be employed, which works by combining multisets. More particularly, the frequency of occurrence of a word (which appears more than once) may be calculated as the sum of such frequencies across a plurality of individual multisets. Second, a type of intersection operation may be employed, whereby only the words (and corresponding frequencies) that are shared among a plurality of multisets are preserved and utilized. Third, a type of filter operation can be used, whereby only the words (and corresponding frequencies) that are labeled according to a user's filter criterion are preserved and utilized.

In view of the foregoing, the invention provides that unique forms of key words can be identified, extracted, and used by the system. For example, a set of podcast key words may be extracted, by identifying the union (i.e., applying a union operation as described above) of high-frequency words, among a set of media files (sets of audio content), which exhibit the same podcast label. Similarly, a set of heat map key words can be extracted, by conducting an intersection operation across key words (having high frequency values) among a plurality of media files—or among the most commonly listened to portions of such media files. In addition, the invention provides that unheard key words may be extracted, which will represent the product of a union operation that identifies a set of key words that are present across a plurality of media files, which have not yet been heard by users (i.e., having no frequency counts). Still further, the invention provides that a set of comment key words may be extracted from the segments of media files that are associated with third party comments. Likewise, personal or account key words can be extracted by identifying all high-frequency key words that are assigned to the edges of the vertices described herein, which are correlated to a single person (as opposed to a media file) or a single user account. Finally, the invention provides that speaker key words may be extracted, which may represent an intersection of audio content and personal key words, and which are restricted to words within a single media file for a particular speaker.

As mentioned above, a primary benefit of the methods described herein is the ability to organize audio content and, more particularly, the words included in such content. This type and level of organization enables the system to execute unique key word extraction algorithms, to identify and even suggest to a user of the system which key word(s) may be relevant to the user (or to otherwise efficiently convey to a user the predicted content of various media files). These unique forms of key words may include many of those referenced above (and others), such as key words that are unique to an individual (or account holder in the system), as well as podcast key words, key words associated with particular speakers, key words derived from unheard content, the heat map key words described above, and key words associated with individuals who have been identified as high-frequency media file listeners, providers, or contributors of content.

The invention provides that the content analysis and key word identification methods described in the section above may be used in a cloud-based system as described or, alternatively, such methods may be used outside of a cloud-based system (e.g., used internally within an organization). In the latter case, the system may generally comprise (1) a means for individuals to upload media into the system and to annotate it; (2) a means for the system to extract the content from within the media; and (3) a means to store and serve the media to users of the system. Still further, it should be noted that such methodology may be applied to not only audio content (or media files that contain audio content), but also basic text files (which are not necessarily the product of an audio-to-text transcription). The invention provides that the content analysis, and key word extraction techniques, described above can be applied to original text files. That is, the key word extraction algorithms described herein are independent of any media file requirements, and may be applied to any text.

The many aspects and benefits of the invention are apparent from the detailed description, and thus, it is intended for the following claims to cover all such aspects and benefits of the invention which fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A system for receiving, analyzing, and organizing audio content contained within a plurality of media files, which comprises a server that is configured to:
    (a) receive, index, and store the plurality of media files, which are received by the server from a plurality of sources, within at least one database in communication with the server;
    (b) perform a text transcription of audio content included within the media files and store said transcription in the database;
    (c) organize audio content included within each of the plurality of media files in at least one vertex of a bipartite graph, wherein each said vertex may be correlated with a specific media file or an individual who is associated with a specific media file, wherein each vertex comprises edges, with each of the edges being labeled with a word that is detected within the audio content of a media file and being assigned a secondary label that may comprise one or more of the following:
        (i) a speaker label that indicates a specific individual is speaking within the corresponding audio content;
        (ii) a share label that indicates that an individual received access to the corresponding audio content from a third party;
        (iii) a podcast label that indicates that an RSS source is correlated to the corresponding audio content;
        (iv) a comment label that indicates that certain commentary, authored by users of the system, has been associated with the corresponding audio content; and
        (v) a frequency label that indicates a number of times that defined portions of the corresponding audio content have been accessed by users of the system; and
    (d) receive a key word that is submitted by a user of the system through a website, whereupon the server queries the database to identify all media files which include the key word, and then list such media files which include the key word in the website in a set of search results.

2. The system of claim 1, wherein an association between a specific media file and an individual may be:
    (a) that the individual is identified by the system as a speaker in the audio content of the media file;
    (b) that the individual uploaded the media file to the system;
    (c) that the individual received and was referred to the media file by another person;
    (d) that the individual accessed the media file and listed to the audio content contained therein; or
    (e) that the individual published and associated comments about the media file.

3. The system of claim 1, wherein one of three operations may be applied to a bipartite graph or a set of bipartite graphs, wherein said operations comprise:
    (a) a union operation, which calculates a sum of frequency values for each of a plurality of words found within the audio content of a plurality of media files, wherein a frequency value represents a number of times that a word is detected within the audio content of a media file;
    (b) an intersection operation, wherein the system calculates a sum of frequency values for only those words that are shared among a plurality of media files; and
    (c) a filter operation, wherein the system calculates a sum of frequency values for only those words that are detected within media files that share a secondary label listed in claim 1.

4. The system of claim 3, which is configured to extract podcast key words from a plurality of media files, which are identified by performing a union operation on a set of media files which exhibit a common podcast label.

5. The system of claim 3, which is configured to extract heat map key words from a plurality of media files, which are identified by performing an intersection operation on a set of key words found within a plurality of media files which exhibit a frequency label that exceeds a minimum threshold.

6. The system of claim 3, which is configured to extract unheard key words from a plurality of media files, which are identified by performing a union operation that identifies a set of key words that are present across a plurality of media files, which have not yet been heard by users of the system.

7. The system of claim 3, which is configured to extract comment key words from a plurality of media files, which are identified within segments of audio recordings that are associated with third party comments.

8. The system of claim 3, which is configured to extract personal or account key words from a plurality of media files, by identifying all key words having a frequency label that exceeds a minimum threshold, which are assigned to the edges of the vertices that are correlated to a single person or account.

* * * * *